(No Model.) 5 Sheets—Sheet 1.
R. THEW.
MACHINE FOR HANDLING AND DISTRIBUTING COAL, &c.

No. 553,082. Patented Jan. 14, 1896.

(No Model.) 5 Sheets—Sheet 2.
R. THEW.
MACHINE FOR HANDLING AND DISTRIBUTING COAL, &c.

No. 553,082. Patented Jan. 14, 1896.

Fig. 2.

Witnesses.
E. B. Gilchrist

Inventor
Richard Thew
By M. D. Leggett & Co
his attorneys.

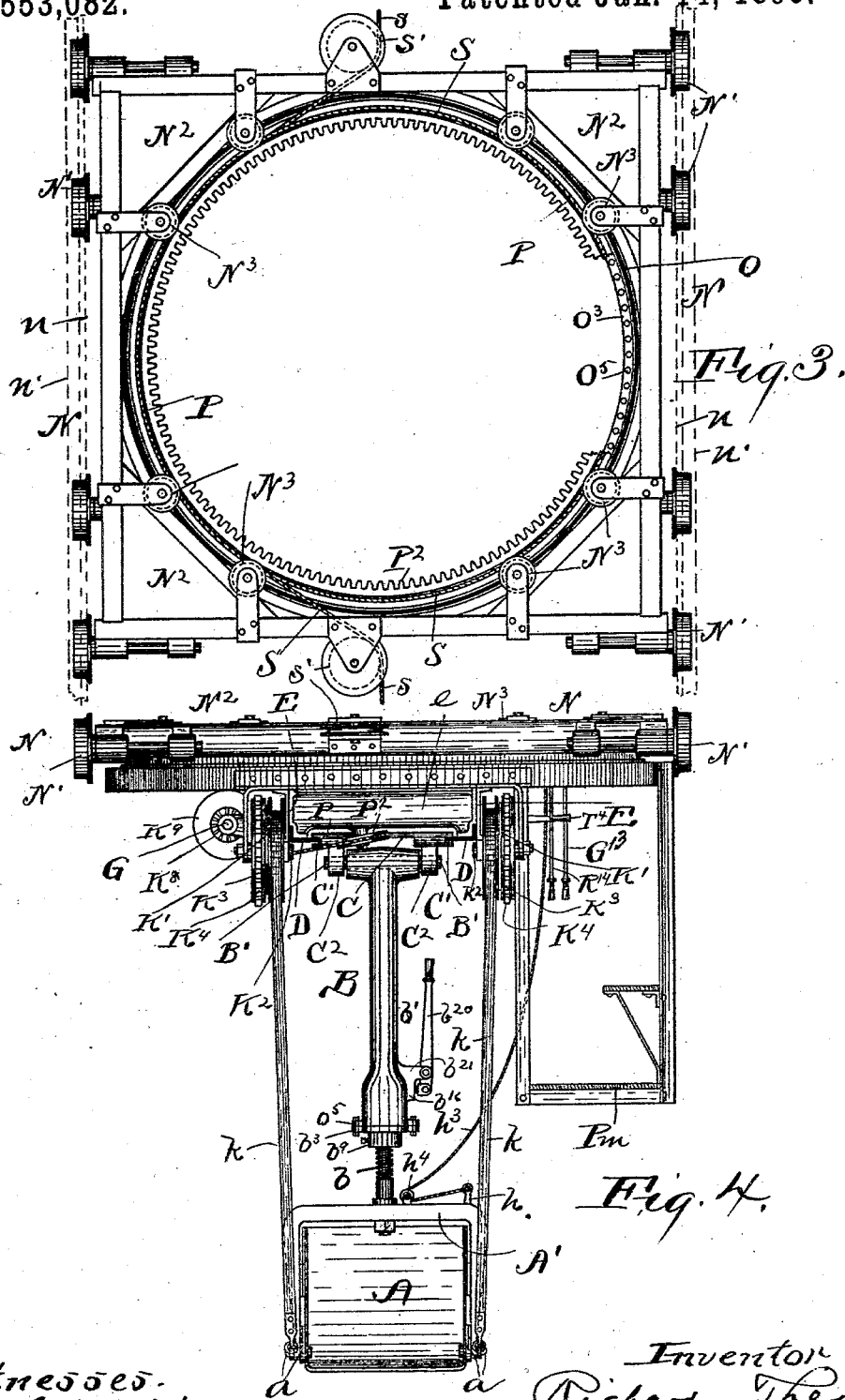

(No Model.) 5 Sheets—Sheet 4.
R. THEW.
MACHINE FOR HANDLING AND DISTRIBUTING COAL, &c.
No. 553,082. Patented Jan. 14, 1896.
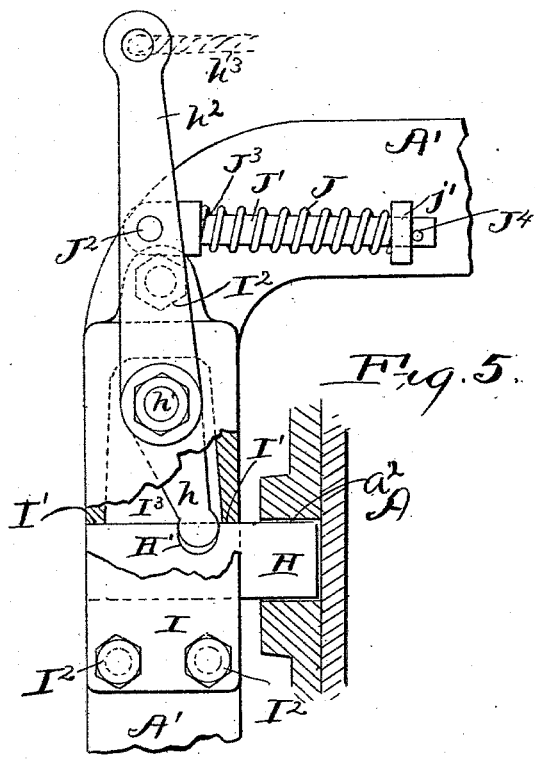
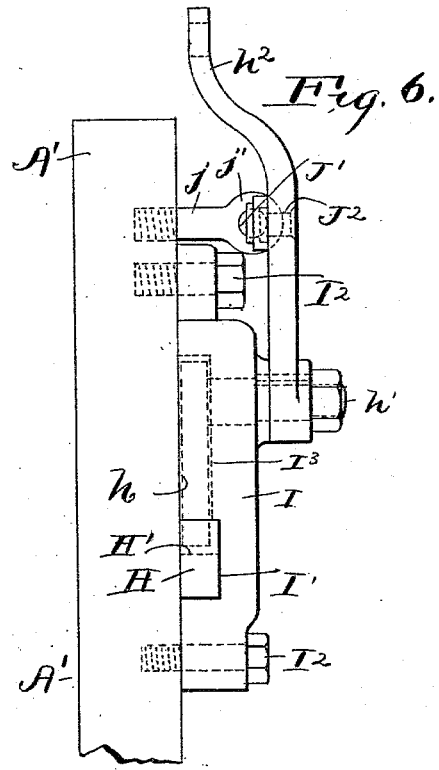
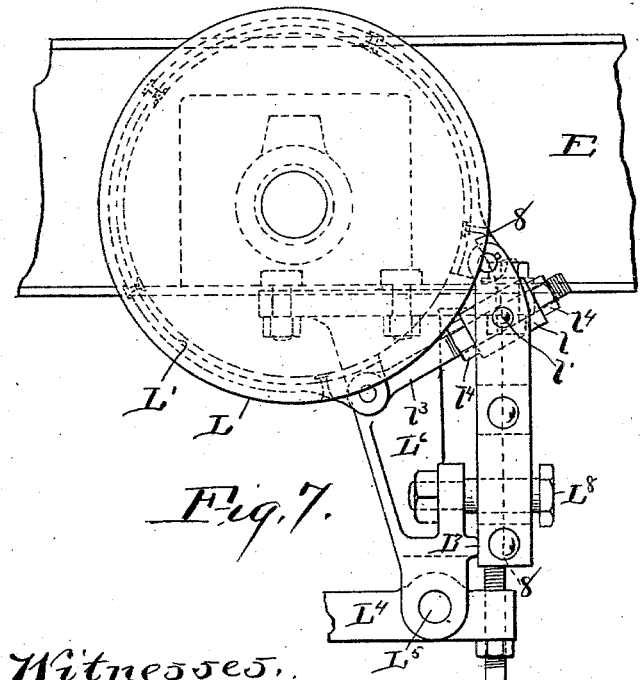
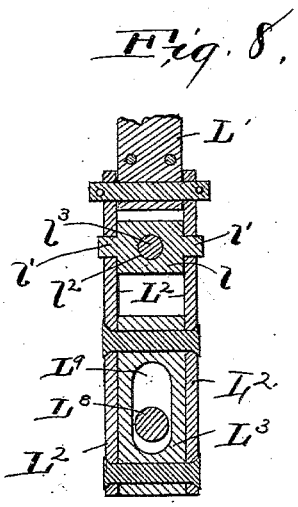
Witnesses:
E. B. Gilchrist
Inventor,
Richard Thew
By M. D. Leggett & Co.
his attorneys (No Model.) 5 Sheets—Sheet 5.

R. THEW.
MACHINE FOR HANDLING AND DISTRIBUTING COAL, &c.

No. 553,082. Patented Jan. 14, 1896.

Witnesses,
E. B. Gilchrist

Inventor,
Richard Thew
By M. D. Leggett & Co.
his Attorneys.

ANDREW B. GRAHAM, PHOTO-LITHO, WASHINGTON, D.C.

UNITED STATES PATENT OFFICE.

RICHARD THEW, OF CLEVELAND, OHIO, ASSIGNOR TO THE THEW AUTOMATIC SHOVELING COMPANY, OF SAME PLACE AND CHARLESTOWN, WEST VIRGINIA.

MACHINE FOR HANDLING AND DISTRIBUTING COAL, &c.

SPECIFICATION forming part of Letters Patent No. 553,082, dated January 14, 1896.

Application filed June 22, 1895. Serial No. 553,655. (No model.)

*To all whom it may concern:*

Be it known that I, RICHARD THEW, of Cleveland, in the county of Cuyahoga and State of Ohio, have invented certain new and useful Improvements in Machines for Handling and Distributing Coal, Ores, or other Material; and I do hereby declare the following to be a full, clear, and exact description of the invention, such as will enable others skilled in the art to which it pertains to make and use the same.

My invention relates to improvements in machines for handling and distributing coal, ores, or other material at docks, furnaces, railway-yards, within the holds of vessels, &c., and serviceable in loading and unloading railway-cars, vessels, &c.; and the invention consists in certain features of construction and combinations of parts, hereinafter described and pointed out in the claims.

In the accompanying drawings, Figure 1 is a side elevation of a machine embodying my invention. In this figure ring Q of traveling bridge or frame E $e$, ring O of the wheeled carriage N, drum P, and internal gear $P^2$ are shown in central vertical section.

Fig. 2 is a top plan of traveling bridge or frame E $e$, engine or motor and connected apparatus or mechanisms and trolley or carriage C borne by said frame or bridge, portions of ring Q being broken away to more clearly show certain mechanisms located below said ring.

Fig. 3 is a top plan of carriage N and drum P and internal gear $P^2$ borne by said carriage. In this figure a portion of the internal gear is broken away to show the perforated flange $O^3$ of ring O of said carriage, and track-bearing trusses $n'$, from which said carriage is supported, are shown in dotted lines.

Fig. 4 is an end elevation of carriage N and bridge or frame E $e$ supported from said carriage. Among other things this figure shows the operator's stand at one side of bridge or frame E $e$, a suitably-driven counter-shaft G at the opposite side and arranged longitudinally of said frame or bridge, track D, rigid with said bridge or frame, trolley or carriage C, engaging and movable endwise of said track, and armed scoop or shovel suitably supported from said carriage or trolley.

Fig. 5 is an elevation, partly in section, of a portion of the scoop or shovel, bail with which said scoop or shovel is provided, and mechanism for locking the scoop or shovel proper to the bail; and Fig. 6 is a left-hand-side elevation relative to Fig. 5.

Fig. 7 is a side elevation of a portion of traveling bridge or frame E $e$, one of the brake-wheels employed in checking or arresting the swinging movement of the scoop or shovel in an upright plane, brake-band for said wheel, the weight suspended from one end of the brake-band, and the lever for elevating said weight.

Fig. 8 is a section on line 8 8, Fig. 7.

Figure 9:
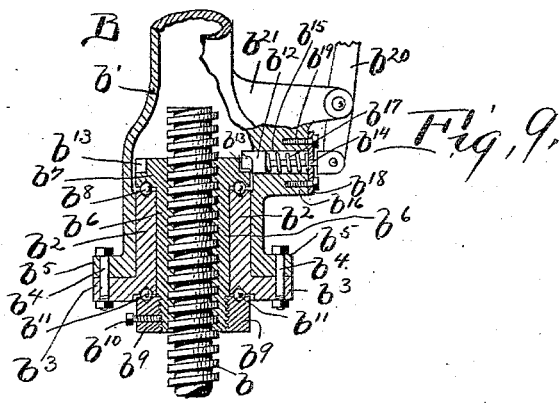

Fig. 9 is a side elevation, mostly in central vertical section, of a portion of the scoop or shovel arm, showing the construction whereby said arm is capable of being lengthened and shortened and showing the mechanism employed for locking the shovel-arm in the desired adjustment.

Figure 10:
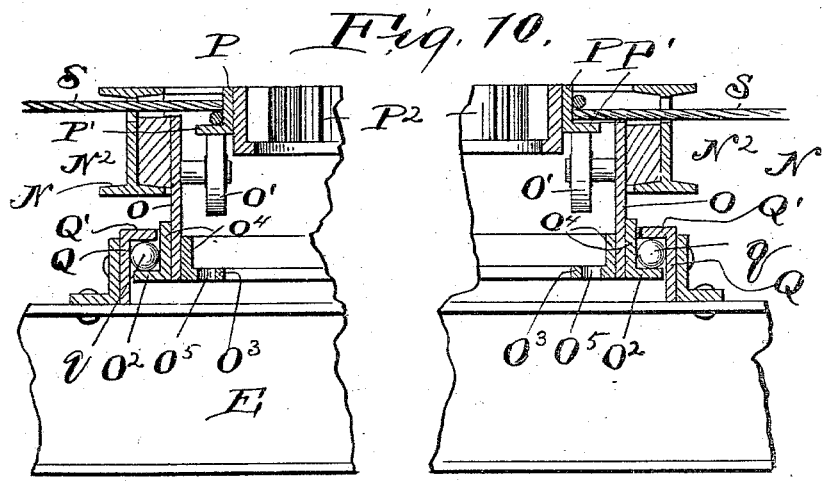

Fig. 10 is a side elevation, mostly in central vertical section, showing a portion of the shovel-bearing traveling bridge or frame, ring Q, rigid, with the top of said frame or bridge, carriage N, drum P, cable S, and internal gear $P^2$. In this figure the central portion of the traveling bridge or frame and its ring Q, carriage N and its ring O, drum and internal gear are broken away to reduce the size of the figure.

Figure 11:
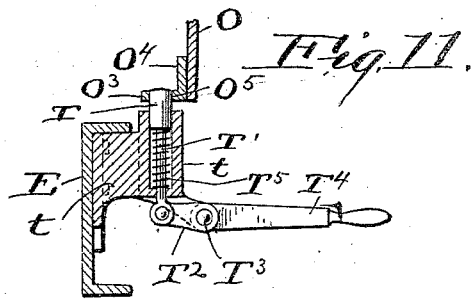

Fig. 11 is an elevation, partly in vertical section, of a portion of the shovel-bearing traveling bridge or frame, perforated internal flange $O^3$ of ring O of the carriage from which the aforesaid frame or bridge is supported, latch or bolt adapted to engage the holes in said flange, spring for normally retaining the bolt or latch in its operative position, and lever mechanism for actuating said latch or bolt into an inoperative position against the action of the spring.

My improved machine comprises a scoop or shovel A, (see Figs. 1 and 4,) adapted to dig into and transfer coal, ore and other material from one place to another. Scoop or shovel A is provided with an upwardly-extending arm B, that at its upper end is pivotally supported from a trolley or carriage C in such a manner that the shovel can be swung in a vertical plane and longitudinally of the trolley in the one direction or the other. Trolley or carriage C comprises preferably a quadrangular frame of any suitable construction, as shown in Fig. 2, and is supported from and movable endwise of an elevated horizontally-arranged track, the rails D whereof are arranged parallel with each other and a suitable distance apart to accommodate the operation of the shovel-carriage or trolley between them. Rails D are preferably composed of angle-iron, and the shovel trolley or carriage is provided with horizontally-arranged recesses $C'$ engaged by the horizontal members of said rails. (See Fig. 4.) This construction of shovel-carriage or trolley is exceedingly simple and durable and comparatively inexpensive. The travel of trolley or carriage C is, of course, limited by the length of track D. The rails of track D are secured in any approved manner to beams or girders E (see Figs. 1, 2 and 4) that are, of course, arranged horizontally and parallel with each other, and are connected and braced apart at suitable intervals by transversely-arranged bars or beams $e$, that, together with girders or beams E, constitute a horizontally-arranged frame or bridge suitable for supporting track D.

The apparatus employed for actuating the shovel carriage or trolley along track D comprises preferably a continuous cable F, whose opposite ends are attached to opposite ends, respectively, of the trolley or carriage, said cable F leading from one end of the trolley at $F'$ (see Fig. 2) outwardly between the rails of track D to and over any suitable number of sheaves or pulleys $F^2$, suitably supported from and at or near one end of bridge or frame E $e$, thence inwardly to and over a winding-drum $f$, supported from and at or near the central portion of said bridge, upon which drum the cable is coiled any suitable number of times to afford the necessary friction, thence leads to and over any suitable number of sheaves or pulleys $F^3$, suitably supported from and at or near the opposite end of bridge E $e$, and thence the cable leads inwardly to its other point of attachment to the trolley or carriage at $F^4$, all whereof is clearly illustrated in Fig. 2, and by which construction it will be observed that the shovel carriage or trolley is moved in the one or the other direction, according as drum $f$, and consequently cable F, is actuated in the one direction or the other.

The mechanism employed for communicating motion to drum $f$ is preferably as follows: Said drum is mounted upon a short shaft $f'$ (see Fig. 2) suitably supported from and at or near the central portion of a supporting beam or girder E, and at one end has operatively connected therewith a bevel-gear $f^2$, that meshes with two bevel-pinions $G'$ and $G^2$ loosely mounted upon the counter-shaft G, that is horizontally arranged at the outer side of and parallel with the aforesaid beam or girder E, and has bearing in any suitable number of boxes $g$ suitably supported from bridge E $e$. Pinions $G'$ and $G^2$ mesh with gear $f^2$ at diametrically-opposite sides, respectively, of the axis of said gear $f^2$, and therefore said gear $f^2$ and the cable-engaging drum operatively connected with said gear will be turned in the one direction or the other according as operative connection is established between shaft G and the one or the other of pinions $G'$ $G^2$. Clutches are employed for establishing operative connection between pinions $G'$ $G^2$ and their supporting-shaft, and friction-clutches are shown employed in the case illustrated, and a different clutch is shown employed for each pinion $G'$ $G^2$. One member $G^3$ of each clutch is rigid with the respective pinion, and the companion member $G^4$ of said clutch is operatively and slidably mounted upon shaft G, operatively connected, in any approved manner, with a swinging lever $G^5$ arranged horizontally and transversely of shaft G and fulcrumed at $G^6$ to any suitable support—such, for instance, as a bracket $G^7$ rigid with bridge E $e$. The two levers $G^5$, at their outer ends, are operatively connected with each other by means of a link $G^8$, and the parts are so arranged that the movable members of both clutches are adapted to be actuated simultaneously, and one of said members operatively engages its companion member while the movable member of the other clutch is out of operative engagement with its companion member, and when the clutch-actuating levers are in their intermediate position the movable members of both clutches shall be disengaged from their companion members, as shown in Fig. 2, when the two driving-pinions $G'$ $G^2$ are idle. One of the clutch-actuating levers is provided with an arm $G^9$ that extends to the operator's platform-bearing side of the machine, which platform is marked P $m$ in Figs. 1, 2 and 4, and at or near which platform lever-arm $G^9$ is operatively connected by a link $G^{10}$ with a depending rock-arm $G^{11}$ of an oscillating shaft $G^{12}$ that is supported in any approved manner from the bridge E $e$, and said shaft $G^{12}$, at its outer end, is provided with a hand-lever $G^{13}$ that extends to within convenient reach of the operator. The operator, therefore, through the instrumentality of lever $G^{13}$, can move the shovel carriage or trolley in the one direction or the other, as desired, and can rest the trolley or carriage at any desired point between the termini of its travel. The clutch-actuating mechanism of the shovel or trolley carriage, and the clutch-actuating lever that extends transversely of the machine to the operator's platform-bearing side, are arranged in a plane above the horizontal plane in which said carriage or trolley operates.

Figure 1:
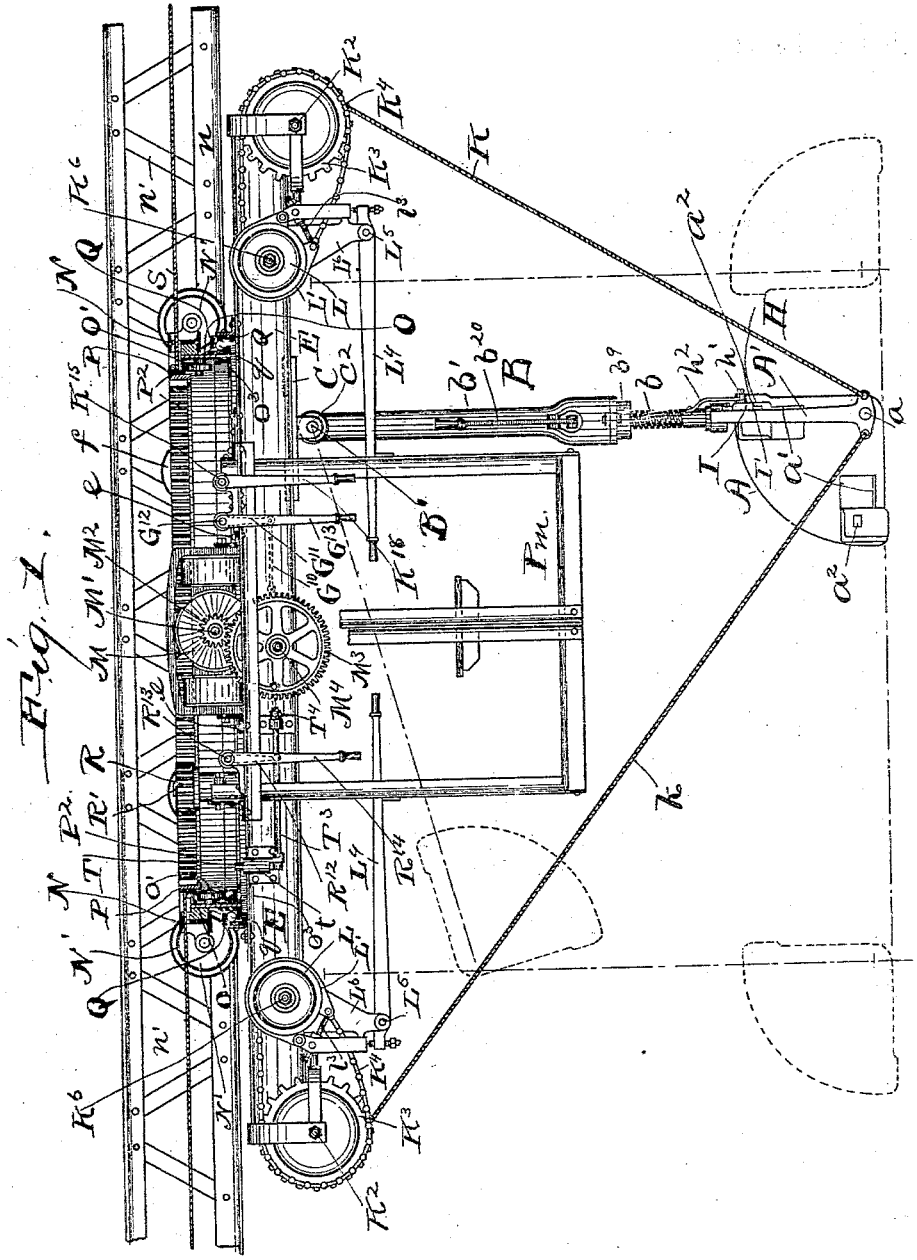

The scoop or shovel is preferably approximately triangular in side elevation, as shown in Fig. 1, and at or near the central portion and lower ends of the sides is provided externally with two trunnions $a$ $a$, located at opposite sides, respectively, of the shovel and engaging corresponding holes in opposite ends, respectively, of the bail A' with which the shovel is provided, said bail extending over the open top of the shovel and being suitably attached, at its central portion, to the shovel-arm B. The shovel is of the double-ended variety, and is adapted to dig or take up a load in opposite directions without necessitating the reversal of the shovel, and the shovel is merely oscillated upon its axis in the one direction or the other, according as the one or the other end of the shovel is to be brought into the position required for taking up a load, or according as the load is to be dumped from the one or the other end of the shovel. Stops are, therefore, provided for limiting the oscillatory movement of the shovel in opposite directions, and said stops consist, preferably, of two plates $a'$ suitably secured to the outer surface of one side of the shovel at opposite ends, respectively, of the shovel, as shown in Fig. 1. Suitable means for locking the shovel in its extreme positions is also provided, and consists preferably of a latch H (see Figs. 5 and 6) slidable endwise of a recess I' formed in and arranged transversely of a plate I removably secured by means of screws or bolts $I^2$ to one side of an end member of the bail. The inner end of latch H is adapted to engage holes $a^2$ $a^2$ in one side and at or near opposite ends, respectively, of the shovel, (see also Fig. 1,) and the arrangement of parts is such that the latch shall be adapted to engage the one or the other of said holes according as the shovel is in the one or the other of its extreme positions.

Latch H is operatively connected in any approved manner with an arm $h$ of an oscillating shaft $h'$ suitably supported from the upper end of and extending outside of plate I, arm $h$ being located within a recess $I^3$ formed in the inner side of plate I, which recess is large enough to accommodate the operation of said arm. Shaft $h'$, at its outer end, outside of plate I is provided with a lever $h^2$. A rope $h^3$ is attached to the outer end of lever $h^2$ and said rope (see Fig. 4) leads to and over a sheave or pulley $h^4$ suitably supported from the central member of the bail and thence leads to the operator's stand, where the operator can conveniently reach the same as required for actuating the shovel-latch into an inoperative position preparatory to taking up a load or dumping the contents of the shovel after the shovel is hoisted or transferred to the place desired. A suitably-applied spring J (see Fig. 5) acts in the direction to retain the shovel-latch in its operative position, and of course the bolt or latch is moved against the action of said spring in releasing the shovel. Spring J is of the spiral variety and is mounted upon a rod J' pivotally secured at one end, as at $J^2$, to the central portion of lever $h^2$ and extending at its opposite end through the eye $j'$ of an eyebolt $j$ screwed into the central member of bail A', the aforesaid spring being confined upon rod J' between the eye of said bolt and a shoulder $J^3$ formed upon said rod near lever $h^2$. A pin or stop $J^4$, with which rod J' is provided at that side of the eyebolt that faces away from lever $h^2$, limits the movement of said rod beyond its normal position when the spring returns the latch-actuating lever mechanism into its normal position. The operative connection between the latch and arm $h$ of shaft $h'$ is shown effected by the engagement of the rounded or convex lower extremity of said arm $h$ with the recess or depression H' formed in the upper side of the latch, as shown in Fig. 5.

The apparatus employed for swinging the shovel in a vertical plane, as required to hoist and lower the shovel, comprises, preferably, two cables K, (see Figs. 1, 2 and 4,) instrumental in swinging the shovel in the one direction, and two cables $k$, instrumental in swinging the shovel in the opposite direction. Cables K $k$ are suitably connected at one end with opposite ends, respectively, of the shovel-bail A', and said cables K $k$ lead upwardly and outwardly, but in opposite directions, respectively, from the point of their attachment to the shovel-bail to and over drums K', suitably supported from frame or bridge E $e$, cables K engaging two different drums, respectively, at one end of bridge E $e$, and cables $k$ engaging two different drums, respectively, at the opposite end of said bridge. Each drum is preferably operatively mounted upon a short shaft $K^2$ (see Fig. 2) suitably supported from bridge E $e$. Each shaft $K^2$, at the outer end of the respective drum K', is provided with a sprocket-wheel $K^3$ operatively mounted upon the shaft and operatively connected by means of a chain $K^4$ with a sprocket-wheel $K^5$ operatively mounted upon a horizontally-arranged shaft $K^6$ that is arranged transversely of and suitably supported from bridge E $e$.

Shafts $K^6$ are preferably located far enough above track D to avoid interference with the operation of the shovel trolley or carriage, as shown in Fig. 1, and each shaft $K^6$ at one end is provided with a bevel-gear $K^7$ that is operatively mounted upon the shaft and meshes with a bevel-pinion $K^8$, loosely mounted upon shaft G. It will therefore be observed that the scoop or shovel will be swung in the one direction or the other, according as operative connection is established between shaft G and the one or the other of driving-pinions $K^8$, and that one set of winding-drums wind up the engaging-cables while the other set of winding-drums are paying out their engaging-cables. Clutches are employed for establishing operative connection between pinions $K^8$ and shaft G. A friction-clutch is shown provided in the case illustrated for each of said driving-pinions. One member $K^9$ of each clutch is rigid with the respective pinion, and the companion member $K^{10}$ of the clutch is operatively and slidably mounted upon the shaft and operatively connected in any approved manner with one end of a horizontally-arranged swinging lever $K^{11}$ that is fulcrumed at or near its central portion, as at $K^{12}$, to any suitable support—such, for instance, as bridge E e—and is operatively connected at its opposite end by means of a link $K^{13}$ with the lower end of a depending arm $K^{14}$ of a horizontally-arranged oscillating shaft $K^{15}$, suitably supported from framework E e at the operator's stand-bearing side of the machine, which shaft at its forward end is provided with a hand-lever $K^{16}$ for turning the same. The arrangement of parts is such that hand-lever $K^{16}$ shall be within convenient reach of the operator, and the clutch-actuating mechanisms, with which said lever is operatively connected, shall be located above track D, so as not to interfere with the operation of the shovel carriage or trolley. The arrangement of parts is, furthermore, such that when hand-lever $K^{16}$ is in its intermediate position pinions $K^8$ shall be operatively disconnected from shaft G, and consequently winding-drums K' shall be idle, and, according as said hand-lever is moved into the one or the other of its extreme positions, operative connection is established between the companion members of one or the other of the aforesaid clutches and the shovel hoisted or lowered toward or from the set of winding-drums operatively connected with the pinion engaging the clutch whose companion members operatively engage each other—that is, if it is desired to hoist or lower the shovel toward or from one set of winding-drums K' hand-lever $K^{16}$ is actuated in the direction required to establish operative connection between said drums and shaft G, and if the shovel is to be hoisted or lowered toward or from the other set of winding-drums K' said lever is moved in the direction required to establish operative connection between said drums K' and shaft G, and if it is desired to hold the shovel at any particular point of its sweep the lever is actuated into or left in its middle position, (shown in Fig. 1,) wherein both sets of winding-drums K' are operatively disconnected from shaft G.

Each shaft $K^6$ at the operator's stand-bearing side of the bridge E e (see Figs. 1 and 2) is provided with a brake-wheel L operatively mounted upon the respective shaft and provided with a peripheral friction-surface adapted to be frictionally engaged by a brake-band L', one end whereof is suitably attached (see Figs. 7 and 8) to the upper ends of a pair of depending plates $L^2$ that are arranged a suitable distance apart. A metallic block $l$, interposed between plates $L^2$ near the aforesaid end of the brake-band, has trunnions $l'$ that have bearing in said plates. Block $l$ is bored centrally, as at $l^2$, through which bore extends a screw-threaded rod $l^3$ suitably attached at one end to the other end of the brake-band. Two nuts $l^4$ mounted upon rod $l^3$ at opposite ends, respectively, of block $l$, adjustably secure the rod to said block, and by manipulating said nuts the tension of the brake-band can be increased or decreased as required. A weight $L^3$ is interposed between and suitably secured to plates $L^2$ below block $l$. Weight $L^3$ serves to automatically tighten the brake-band upon the brake-wheel, and the brake-band is, therefore, normally tightened upon the brake-wheel.

Suitable means for elevating weight $L^3$, and thereby loosening the brake-band upon the brake-wheel, is provided, and consists, preferably, of a vertically-tilting lever $L^4$ that is fulcrumed at $L^5$ to any suitable support—such, for instance, as a hanger or bracket $L^6$ depending from and rigid with bridge E e—said lever having a short arm engaging the lower end of weight $L^3$ and the other arm of the lever extending to the operator's stand, within convenient reach of the operator. By means of lever $L^4$ the brake-band can be loosened more or less relative to the brake-wheel, and the brake-band, upon releasing the lever, is automatically tightened by means of weight $L^3$. The brake-band, of course, is retained loosened more or less relative to the brake-wheel during the hoisting and lowering of the shovel, and is rendered operative when it is desired to arrest or hold the shovel at any particular place. Stops for preventing weight $L^3$ from swinging out of the reach of the short arm of the lever $L^4$ are provided, and consist, preferably, of a lug $L^7$ rigid with hanger or bracket $L^6$, and a bolt $L^8$ secured to said bracket, and the arrangement of parts is such that the head of the bolt and aforesaid lug shall limit the movement of the weight in opposite directions, respectively, as shown in Fig. 7, and the weight is perforated, as at $L^9$, to accommodate the location of bolt $L^8$.

Shovel-arm B is adapted to be lengthened and shortened as required to accommodate the operation upon the varying height of the pile of coal, ore or other material operated upon, and to this end the shovel-arm is composed of two sections, $b$ and $b'$, respectively, and the lower section, $b$, is capable of moving endwise of the upper section, $b'$, and the upper section, $b'$, at its upper end is provided with trunnions B', that have bearing in ears or lugs $C^2$, rigid with and depending from the shovel-carriage or trolley. (See Figs. 1 and 4.) Section $b'$ of the shovel-handle, or at least the lower portion of said section, is hollow or tubular, as shown in Fig. 9, and an annular bushing $b^2$ is suitably secured within the lower end of said tubular section, said bushing $b^2$ being provided at its outer end with an external annular flange $b^3$, bolted, as at $b^4$, to an annular flange $b^5$, formed externally of the lower extremity of section $b'$. An internally-screw-threaded sleeve $b^6$ engages bushing $b^2$ internally and is suitably supported from the inner end of said bushing, said sleeve $b^6$ at its inner end being preferably provided with an external annular flange $b^7$ that overhangs the inner end of bushing $b^2$, and antifriction-balls $b^8$ are interposed between the inner end of bushing $b^2$ and flange $b^7$. Sleeve $b^6$ extends a suitable distance below bushing $b^2$, and the outer end of said sleeve below the bushing is externally screw-threaded and engaged by a correspondingly-threaded nut $b^9$ that is preferably fixed to the sleeve by any suitable means—such, for instance, as a set-screw $b^{10}$—and antifriction-balls $b^{11}$ are shown interposed between the inner end of said nut and the outer end of bushing $b^2$. By the construction just hereinbefore described it will be observed that sleeve $b^6$ is capable of easily turning upon its axis. The lower section, $b$, of the shovel-handle is a screw whose threads mutually engage with the internal threads of sleeve $b^6$, and hence it will be observed that the shovel-handle will be lengthened or shortened and the shovel correspondingly lowered or elevated according as sleeve $b^6$ is turned in the one direction or the other. Sleeve $b^6$ is turned by forcibly pulling apart sections $b$ and $b'$ of the shovel-arm. Suitable means for locking sleeve $b^6$ in the desired adjustment of the parts is provided, and consists, preferably, of a bolt $b^{12}$, adapted to engage a hole or holes $b^{13}$, formed in flange $b^7$ of the aforesaid sleeve, that is provided with any suitable number of said holes $b^{13}$, arranged at suitable intervals circumferentially of the aforesaid flange. The shank or stem $b^{14}$ of the bolt extends outwardly through the bore $b^{15}$ of a perforated lug $b^{16}$, with which section $b'$ of the shovel-handle, near its lower extremity, is provided, and a spiral spring $b^{17}$ is confined upon the bolt shank or stem between the bolt-head and a plate $b^{18}$, removably secured to the outer end of lug $b^{16}$ by means of screws or bolts $b^{19}$, and suitably perforated at its central portion to accommodate the location and operation of the bolt stem or shank. Spring $b^{17}$ acts in the direction to retain the bolt in its shot or locking position, and a hand-lever $b^{20}$, operatively connected with the outer end of the shank or stem of the bolt and fulcrumed to an arm or bracket $b^{21}$, rigid with section $b'$ of the shovel-handle, is provided for actuating the bolt into an inoperative position against the action of the aforesaid spring. Hand-lever $b^{20}$ extends upwardly to within convenient reach from the operator's stand, as shown in Figs. 1 and 4.

The engine or motor, preferably an electric motor M, (see Figs. 1 and 2,) from which shaft G receives its motion, is supported from and above the central portion of frame or bridge E $e$. M' designates the engine or motor shaft that is arranged transversely of the aforesaid bridge or frame. One end of shaft M' extends to the operator's platform-bearing side of the machine, and a pinion $M^2$ is operatively mounted upon said end of the shaft. Said pinion meshes with a spur-gear $M^3$ operatively mounted upon a shaft $M^4$ that is arranged below and parallel with the engine or motor shaft and a suitable distance above track D. Shaft $M^4$ is suitably supported from frame or bridge E, and is intergeared, as at $M^5$, with shaft G.

Suitable apparatus for moving frame or bridge E $e$ longitudinally in opposite directions, and for swinging or turning said bridge in a horizontal plane in the one direction or the other, is provided. Said frame or bridge is, therefore, suitably supported from a carriage N, a top plan whereof is shown in Fig. 3, which carriage (see also Fig. 1) is mounted upon a track $n$, the two rails whereof are rigid with two stationary trusses or bridges $n'$ arranged horizontally and parallel with each other a suitable distance above track D. Carriage N has any suitable number of wheels N' engaging track $n$. A horizontally-arranged ring O (see Figs. 1, 2, 3, 4 and 10) is located centrally of the framework $N^2$ of carriage N and is suitably secured to said framework, said ring, upon its inner side, being provided with any suitable number of wheels or rollers O' arranged at suitable intervals. A horizontally-arranged winding-drum P, having a comparatively large diameter, is mounted upon rollers or wheels O' that are shown engaging an annular flange P' formed externally upon the lower end of the drum. Ring O, at its lower end, and externally, is provided with an annular flange $O^2$, and, at the same end, but internally, is provided with an annular flange $O^3$. Flanges $O^2$ $O^3$, in the case illustrated, are formed upon rings $O^4$ of angle-iron suitably secured to ring O. A ring Q, whose internal diameter is greater than the external diameter of ring O, surrounds the lower end of said ring O, and is rigidly secured in any approved manner to frame or bridge E $e$. Ring Q, at its upper end, and internally, is provided with an annular flange Q' that overhangs flange $O^2$ of ring O. Antifriction-balls $q$ are interposed between flange Q' of ring Q and flange $O^2$ of ring O.

A series of horizontally-arranged sheaves or wheels $N^3$, (see Figs. 3 and 4,) with which framework $N^2$ is provided about the upper end of drum P, afford lateral bearing for said drum.

An internal annular gear $P^2$ is rigidly secured in any approved manner to the inner side of annular drum P. A pinion R meshes with said internal gear and is operatively mounted upon an upright shaft R'. (See Figs. 1 and 2). Said upright shaft is supported in any approved manner from frame or bridge E $e$, and a bevel-gear $R^2$ is operatively mounted upon the lower end of said shaft, and said gear meshes with two bevel-pinions $R^3$ $R^4$ loosely mounted upon shaft G, at opposite sides, respectively, of gear $R^2$, by which construction, it will be observed, pinion R will be turned in the one direction or the other, according as operative connection is established between shaft G and the one or the other of pinions $R^3 R^4$. Clutches are employed for establishing operative connection between said pinions $R^3 R^4$ and shaft G. Friction-clutches are shown in the case illustrated. One member $R^5$ of each clutch is rigid with the respective pinion, and the companion member $R^6$ of said clutch is operatively and slidably mounted upon shaft G. The slidable clutch member $R^6$ is operatively connected in any improved manner with a horizontally-arranged swinging lever $R^7$ supported from bridge E e and fulcrumed at $R^8$. The two levers $R^7$ at their outer ends are operatively connected with each other by means of a link or rod $R^9$. One of said levers $R^7$ has an arm $R^{10}$ extending transversely of bridge or frame E e to near the operator's platform-bearing side, where said arm is operatively connected by means of a link $R^{11}$ with the lower end of a depending arm $R^{12}$ of an oscillating shaft $R^{13}$ suitably supported from frame or bridge E e at the operator's platform-bearing side of the machine, and shaft $R^{13}$ at its forward end is provided with a hand-lever $R^{14}$ for turning the same, which lever extends to within convenient reach of the operator, as shown in Figs. 1, 2, and 4.

The arrangement of parts is such that when lever $R^{14}$ is in its middle or intermediate position the members of both clutches employed in establishing operative connection between pinions $R^3 R^4$ and shaft G are operatively disengaged from each other, and said pinions, and consequently pinion R, are idle, and said pinion R is operatively connected with shaft G when, and turned in the one direction or the other according as, operative connection is established between the members of one or the other of the aforesaid clutches by actuating-lever $R^{14}$ into the one or the other of its extreme positions. A cable S is coiled once or twice around drum P and extends from opposite sides of said drum (see Figs. 1 and 3) in opposite directions, respectively, and over suitably-supported sheaves S', and is fixed at its ends to any stationary objects. (Not shown.)

By the construction hereinbefore described it will be observed that bridge or frame E e, being supported from antifriction-bearings, (balls q,) is, when the same is locked to carriage N, readily swung or turned horizontally in the one direction or the other by means of the revolution of pinion R (in mesh with internal gear $P^2$) about the axis of the aforesaid frame or bridge, and it will be observed that the internal gear remains stationary during said operation of frame or bridge E e. When, however, frame or bridge E e is locked to carriage N, pinion R will be held stationary and internal gear $P^2$ will be rotated, thereby winding up cable S from one side of drum P and paying out said cable from the opposite side of the drum, and thereby propelling carriage N, and frame or bridge E e locked thereto, in the direction of the end of the cable being wound upon the drum. Carriage N, and consequently the frame or bridge E e locked to the carriage, will be propelled in the one direction or the other according as pinion R and the engaging internal gear and attached drum are rotated in the one or the other direction. The means employed for locking frame or carriage E e to carriage N is shown (see Figs. 1, 2 and 11) to consist of an upright bolt adapted to slide endwise of an upright case t suitably supported from the aforesaid bridge or frame, preferably near the operator's stand. The upper end or head T of the bolt is adapted to engage holes $O^5$ with which the internal flange $O^3$ of ring O is provided at short intervals. (See also Figs. 3 and 10.) The stem or shank T' of the bolt extends downwardly through case t, and at its lower end is operatively connected with the outer end of an arm or lever $T^2$, operatively mounted upon a horizontally-arranged shaft $T^3$ that is suitably supported from bridge or frame E e. Shaft $T^3$ at one end is provided with a hand-lever $T^4$ that extends within convenient reach of the operator. A spring $T^5$ acts in the direction to retain the bolt in its normal or shot position, said spring being confined upon the shank or stem of the bolt at the inner end of the head of the bolt. The operator, therefore, when he desires to swing or turn frame or bridge E e horizontally first actuates the bolt, through the instrumentality of lever $T^4$, into an operative position against the action of spring $T^5$, and when the bridge or frame has been turned or swung into the position desired the operator releases the lever and permits the spring to automatically actuate the bolt into an operative position.

Briefly described, in my improved machine hereinbefore described the arm of the shovel or scoop is adapted to be lengthened and shortened and locked in the desired adjustment. The shovel is adapted to dig or take up a load in opposite directions and is adapted to be swung in a vertical plane in the one direction or the other. The trolley or carriage from which the shovel-arm is suspended is movable longitudinally of a bridge or frame that is capable of being moved longitudinally and is adapted to be swung or turned in a horizontal plane.

The brake mechanism for braking and arresting the motion of the mechanism for hoisting and lowering the shovel is exceedingly simple in construction and convenient. The engine or motor employed is supported centrally of bridge or frame E e, where it is out of the way, and where its weight is equally distributed between all sides of the machine. All the clutches employed are arranged upon one and the same counter-shaft G, to which motion is communicated from the engine or motor-shaft. Said counter-shaft is located at one side of the machine, and the operator's stand is located at the opposite side of the machine, and the clutch-actuating mechanisms are all rendered operative through the instrumentality of levers reachable from the operator's stand.

It will, of course, be observed that the counter-shaft G should be provided with some means—such, for instance, as collars $g'$—for preventing pinions $G'$, $G^2$, and $K^3$ from being displaced endwise in establishing operative connection between the clutch members attached to said pinions and the companion clutch members.

What I claim is—

1. In a machine of the variety indicated, the combination of an elevated frame or bridge E $e$, track D rigid with said bridge or frame, a trolley or carriage engaging and movable endwise of said track, a suitably-actuated winding-drum $f$ supported centrally, or approximately centrally, of the bridge or frame, a continuous cable F engaging the aforesaid drums and having its opposite ends engaging the trolley or carriage, suitably supported guide-sheaves or pulleys for said cable, shovel or scoop suitably suspended from the aforesaid trolley or carriage and suitably actuated cables for swinging the scoop or shovel in an upright plane, substantially as set forth.

2. In a machine of the variety indicated, the combination of an elevated frame or bridge E $e$, a track D suitably supported from and arranged longitudinally of said bridge or frame, a trolley or carriage engaging and movable endwise of said track, suitably driven countershaft supported at one side of the aforesaid bridge or frame, suitably supported short shaft $f'$ arranged at right angles to the aforesaid countershaft, a bevel gear $f^2$ operatively mounted upon said shaft $f'$, two bevel pinions $G'$ and $G^2$ loosely mounted upon the countershaft at opposite sides, respectively, of and in mesh with the aforesaid gear, winding-drum $f$ operatively mounted upon shaft $f'$, continuous cable F having its opposite ends engaging the aforesaid carriage or trolley, and a clutch for each of the aforesaid pinions for establishing and interrupting operative connection between the respective pinion and countershaft, a scoop or shovel suitably suspended from the aforesaid carriage or trolley, and suitably actuated cables for swinging the shovel or scoop in an upright plane, substantially as shown, for the purpose specified.

3. In a machine of the variety indicated, the combination with an elevated frame or bridge E $e$, a track D suitably supported from and arranged longitudinally of said bridge or frame, shovel-bearing trolley or carraige engaging and movable endwise of said track, suitably driven countershaft supported from and at one side of said bridge or frame, operator's stand supported from the opposite side of said bridge or frame, winding-drum $f$, cable F, guide-sheaves or pulleys $F^2$, $F^3$, and shaft $f'$, of bevel-gear $f^2$, bevel pinions $G'$ and $G^2$, a clutch for each of said pinions, lever-mechanism for each clutch for rendering said clutch operative or inoperative, a hand-lever within convenient reach from the operator's stand and operatively connected with the aforesaid clutch-lever-mechanisms, the arrangement of parts being such that when said lever is in its intermediate position the clutches shall be inoperative, and one or the other of the clutches shall be rendered operative according as said lever is moved into the one or the other of its extreme positions, substantially as set forth.

4. In a machine of the variety indicated, the combination with an elevated frame or bridge E $e$, track D, shovel-bearing trolley or carriage C engaging the track, and operator's stand, of suitably-actuated countershaft G, gears $G'$, $G^2$, clutches $G^3$ $G^4$, levers $G^5$ operatively connected with the movable members of the clutches, link $G^8$, lever-arm $G^9$, link $G^{10}$, depending lever-arm $G^{11}$, shaft $G^{12}$, hand-lever $G^{13}$, winding-drum $f$, cable F, guide-sheaves or pulleys $F^2$ $F^3$, shaft $f'$ and bevel-gear $f^2$, all arranged and operating substantially as shown, for the purpose specified.

5. In a machine of the variety indicated, the combination with an elevated bridge or frame E $e$, track D rigid with and arranged longitudinally of said bridge or frame, suitably actuated trolley or carriage engaging and movable endwise of said track, armed shovel or scoop having an armed bail adapted to swing in an upright plane and having its arm pivotally supported from the aforesaid trolley or carriage, of a set of two suitably actuated winding-drums $K'$ at each end of the aforesaid bridge or frame, and two cables for each set of winding drums, said two cables engaging the different drums, respectively, and being connected with opposite ends, respectively, of the shovel-bail, substantially as shown, for the purpose specified.

6. In a machine of the variety indicated, the combination with an elevated bridge or frame E $e$, track D rigid with and arranged longitudinally of said bridge or frame, suitably-actuated trolley or carriage engaging and movable endwise of said track, armed shovel or scoop adapted to swing in an upright plane and having its arm pivotally supported from the aforesaid trolley, cables K $k$, drums $K'$, shafts $K^2$, sprocket-wheels $K^3$, chains $K^4$, sprocket-wheels $K^5$, shafts $K^6$, gears $K^7$, pinions $K^8$, suitably actuated shaft G, and a suitably actuated clutch for each of said pinions for establishing and interrupting operative connection between the respective pinion and shaft, substantially as set forth.

7. In a machine of the variety indicated, the combination with an elevated bridge or frame E $e$, track D rigid with and arranged longitudinally of said bridge or frame, suitably-actuated trolley or carriage movable endwise of said track, armed shovel or scoop adapted to swing in an upright plane and having its arm pivotally supported from the aforesaid trolley, two sets of winding-drums $K'$ located at and suitably supported from opposite ends, respectively, of the aforesaid bridge or frame, cables engaging the winding-drums and suitably connected with the shovel, suitably actuated countershaft G arranged at one side and longitudinally of and suitably supported from the aforesaid bridge or frame, operator's stand supported from the opposite side of said frame or bridge, mechanism for each set of winding-drums for establishing and interrupting operative connection between the countershaft and said set of winding-drums, a lever reachable from the operator's stand and operatively connected with both of said mechanisms, and the arrangement of parts being such that the one or the other set of winding-drums shall be operatively connected with the shaft according as the lever is moved into the one or the other of its extreme positions, substantially as set forth.

8. In a machine of the variety indicated, the combination with an elevated frame or bridge E e, track rigid with and arranged longitudinally of said bridge or frame, trolley or carriage engaging and movable endwise of said track, shovel or scoop having a bail whose central member is provided with an arm pivotally supported from the aforesaid trolley, two sets of winding-drums for swinging the scoop or shovel in an upright plane, said sets of drums being located at and supported from opposite ends, respectively, of the aforesaid frame or bridge, cables engaging the drums and suitably connected with the shovel-bail, a suitably driven countershaft G arranged at one side and longitudinally of and suitably supported from the aforesaid frame or bridge, mechanism for establishing and interrupting operative connection between each set of winding-drums and said shaft and comprising a bevel pinion $K^8$ loosely mounted upon the shaft, a clutch for establishing and interrupting operative connection between said pinion and shaft, and lever-mechanism for rendering the clutch operative or inoperative and comprising a horizontally arranged swinging lever $K^{11}$ operatively connected, at one end, with the clutch, an oscillating shaft $K^{15}$ having a depending arm $K^{14}$ and a hand-lever $K^{16}$, and a link operatively connecting said depending-arm with the aforesaid swinging-lever, all arranged and operating substantially as shown, for the purpose specified.

9. In a machine of the variety indicated, the combination with a frame or bridge E e, track D rigid with and arranged longitudinally of said frame or bridge, suitably actuated trolley or carriage engaging and movable endwise of said track, armed scoop or shovel adapted to swing in an upright plane and having its arm pivotally supported from the aforesaid trolley or carriage, two sets of suitably-actuated winding-drums located at and suitably supported from opposite ends, respectively, of the aforesaid bridge or frame, and cables engaging said drums and suitably connected with the shovel, of a brake-wheel operatively connected with each set of drums, each brake-wheel being provided with a peripheral friction surface, a brake-band adapted to frictionally engage said surface, means for normally holding the brake-band operative, and means for loosening the band upon the brake-wheel, substantially as and for the purpose set forth.

10. In a machine of the variety indicated, the combination with a frame or bridge E e, track D rigid with and arranged longitudinally of said frame or bridge, suitably-actuated trolley or carriage engaging and movable endwise of said track, armed scoop or shovel adapted to swing in a vertical plane and having its arm pivotally supported from the trolley or carriage, suitably-actuated winding-drums and cables for swinging the shovel in an upright plane, of brake-wheels operatively connected with the drums, each brake-wheel being provided with a peripheral friction surface, a brake-band adapted to frictionally engage said surface, a weight suspended from one end of the brake-band, the other end of the band being suitably connected with the object employed in suspending the weight, and a lever for elevating the weight, substantially as and for the purpose set forth.

11. In a machine of the variety indicated, the combination of a winding-drum employed in swinging the shovel in a vertical plane, a brake-wheel operatively connected with said drum and provided with a peripheral friction surface, a brake-band adapted to frictionally engage said surface, two weighted plates $L^2$ depending from one end of the band, metallic block interposed between said plates and provided with trunnions journaled in the plates, screw-threaded rod suitably attached to the other end of the band and extending through the aforesaid block, nuts mounted upon said rod at opposite ends, respectively, of the block, and means for elevating the weight, substantially as shown, for the purpose specified.

12. In a machine of the variety indicated, the combination with an elevated bridge or frame E e, track D rigid with and arranged longitudinally of said bridge or frame, suitably actuated trolley or carriage movable endwise of said track, an armed shovel or scoop adapted to swing in an upright plane and having its arm pivotally supported from the aforesaid trolley or carriage, winding-drums at each end of the aforesaid bridge or frame, drum-supporting shafts, and cables engaging the winding-drums and suitably connected with the shovel, shafts $K^6$ operatively connected with the drum-supporting shafts, bevel-gears $K^7$, suitably driven counter shaft G, pinions $K^8$ loosely mounted upon said countershaft, a clutch for each of said pinions for establishing and interrupting operative connection between the shaft and respective pinion, lever mechanism for each clutch for rendering the clutch operative or inoperative, the two clutch-lever-mechanisms being operatively connected with each other, and the arrangement of parts being such that when operative connection is established between shaft G and the winding-drums at one end of the supporting-frame or bridge, operative connection is interrupted between said shaft and the winding-drums at the opposite end of said bridge, substantially as set forth.

13. In a machine of the variety indicated, the combination of the scoop or shovel-arm capable of being lengthened and shortened and consisting of a hollow or tubular section and a screw extending into the tubular section, an internally screw-threaded sleeve engaging the screw and turnably supported from the tubular section, said sleeve being provided with any suitable number of recesses or holes arranged at suitable intervals about the axis of the sleeve, a suitably supported bolt or latch adapted to engage said holes or recesses, a spring acting to retain said latch or bolt in its operative position, and a lever for actuating the bolt or latch into an inoperative position against the action of the spring, substantially as set forth.

14. In a machine of the variety indicated, the combination of an elevated bridge or frame E e capable of turning in a horizontal plane, apparatus for turning said bridge or frame, a track rigid with and arranged longitudinally of the frame or bridge, a suitably actuated trolley or carriage engaging and movable endwise of said track, and a suitably actuated scoop or shovel having an arm suitably supported from the carriage or trolley and adapted to swing in an upright plane, substantially as and for the purpose set forth.

15. In a machine of the variety indicated, the combination of an elevated track $n$, a suitably-actuated carriage N engaging and movable endwise of said track, a frame or bridge E e turnably supported from said carriage and provided with a track, a suitably-actuated trolley or carriage C engaging and movable endwise of said last-mentioned track, and a suitably actuated shovel or scoop having an arm suitably supported from said last-mentioned carriage or trolley, and capable of being swung in an upright plane, substantially as set forth.

16. In a machine of the variety indicated, the combination of an elevated track $n$, a suitably-actuated carriage N engaging and movable endwise of said track, a drum P rotatably supported from said carriage, cable S operatively engaging the drum and having its ends fixed to stationary objects, an internal gear operatively connected with said drum, shovel-bearing bridge or frame E e supported from the aforesaid carriage by means of anti-friction bearings, a suitably actuated pinion meshing with the aforesaid gear and borne by the aforesaid frame or bridge, and means for locking said frame or bridge to the carriage, substantially as set forth.

17. In a machine of the variety indicated, in combination, an elevated track $n$, suitably actuated carriage N engaging and movable endwise of said track, said carriage comprising a ring O arranged in a horizontal plane and provided, upon its inner side, with any suitable number of rollers or wheels O', and, at its lower end, with an external flange $O^2$, a horizontally-arranged drum P mounted upon said wheels or rollers, cable S operatively engaging said drum and fixed, at its ends, to stationary objects, an internal gear $P^2$ operatively connected with the drum, shovel-bearing frame or bridge E e turnably supported from said carriage, and provided, at the top, with a ring Q, that at its upper end has an internal flange Q' overhanging flange $O^2$, anti-friction balls $q$ interposed between said flanges Q' and $O^2$, a suitably actuated pinion supported from the aforesaid bridge or frame and meshing with the aforesaid gear, and means for locking the frame or bridge to the carriage, substantially as set forth.

18. In a machine of the variety indicated, in combination, an elevated track $n$, suitably actuated carriage N engaging and movable endwise of said track, said carriage comprising a horizontally-arranged ring O provided, upon its inner side, with any suitable number of rollers or wheels O', said ring, at its lower end, being provided with an external flange $O^2$ and having an internal flange $O^3$ provided with upright holes $O^5$ at suitable intervals, a horizontally-arranged drum P mounted upon the aforesaid wheels or rollers, cable S operatively engaging said drum and fixed at its ends to stationary objects, internal gear $p^2$ operatively connected with said drum, shovel-bearing frame or bridge E e horizontally arranged below the aforesaid carriage, said frame or bridge, at the top, being provided with a horizontally-arranged ring Q terminating at its upper end in an internal flange overhanging the external flange of the aforesaid drum-bearing ring and anti-friction balls $q$ interposed between said flanges, a suitably actuated pinion in mesh with the aforesaid internal gear and supported from the aforesaid bridge or frame, a latch or bolt adapted to engage the aforesaid holes, spring acting to retain said bolt or latch in its operative position, and means for actuating the bolt into an inoperative position against the action of the spring, substantially as set forth.

19. In a machine of the variety indicated, in combination, an elevated track $n$, suitably actuated carriage N engaging and movable endwise of said track, said carriage comprising a horizontally-arranged ring O provided, upon its inner side, with any suitable number of rollers or wheels O', said ring, at its lower end, being provided with an internal flange $O^3$ that has holes $O^5$ at suitable intervals, a horizontally-arranged drum P mounted upon the aforesaid wheels or rollers, cable S operatively connecting said drum and fixed at its ends to stationary objects, internal gear $P^2$ operatively connected with said drum, shovel-bearing frame or bridge E e horizontally arranged below the aforesaid carriage, said bridge or frame, at the top, having a horizontally-arranged ring Q turnably supported from the aforesaid drum-bearing ring by anti-friction bearings, a suitably actuated pinion in mesh with the aforesaid internal gear and supported from the aforesaid bridge or frame, a latch or bolt adapted to engage the aforesaid holes, a case surrounding said bolt or latch and rigid with the aforesaid bridge or frame, a spring confined within said case and acting to retain the latch or bolt in its operative position, an oscillating shaft operatively connected with the bolt or latch, and means for turning the shaft, substantially as and for the purpose set forth.

20. In a machine of the variety indicated, in combination, an elevated track $n$, suitably actuated carriage N engaging and movable endwise of said track, said carriage comprising a ring O arranged in a horizontal plane and provided upon its inner side with any suitable number of rollers or wheels O', a horizontally-arranged drum P mounted upon said wheels or rollers, cable S operatively engaging said drum and fixed at its ends to stationary objects, an internal gear $P^2$ operatively connected with the drum, shovel-bearing frame or bridge E $e$ turnably supported from said carriage, a suitably actuated pinion supported from the aforesaid bridge or frame and meshing with the aforesaid gear, means for locking the frame or bridge to the carriage, an upright shaft operatively connected with the aforesaid pinion, bevel-gear operatively mounted upon said shaft, suitably-actuated countershaft G, pinions $R^3$ and $R^4$ loosely mounted upon said countershaft at opposite sides, respectively, of the bevel-gear, and a clutch for each of said pinions $R^3$ $R^4$ for establishing and interrupting operative connection between the respective pinion and its supporting shaft, all arranged and operating substantially as shown, for the purpose specified.

21. In a machine of the variety indicated, in combination, an elevated track $n$, suitably actuated carriage N engaging and movable endwise of said track, said carriage comprising a ring O arranged in a horizontal plane and provided, upon its inner side, with any suitable number of rollers or wheels O', a horizontally-arranged drum P mounted upon said wheels or rollers, cable S operatively engaging said drum and fixed at its ends to stationary objects, an internal gear $P^2$ operatively connected with the drum, shovel-bearing frame or bridge E $e$ turnably supported from said carriage, a suitably actuated pinion supported from the aforesaid bridge or frame and meshing with the aforesaid gear, means for locking the frame or bridge to the carriage, an upright shaft operatively connected with said pinion, bevel-gear operatively mounted upon said shaft, suitably actuated countershaft G, pinions $R^3$ and $R^4$ loosely mounted upon said countershaft at opposite sides, respectively, of the bevel-gear, and a clutch for each of said pinions $R^3$ $R^4$ for establishing and interrupting operative connection between the respective pinion and its supporting shaft, levers $R^7$, rod or link $R^9$, lever-arm $R^{10}$, link $R^{11}$, depending arm or lever $R^{12}$, shaft $R^{13}$, and hand-lever $R^{14}$, all arranged and operating substantially as shown, for the purpose specified.

22. In a machine of the variety indicated, in combination, an elevated track $n$, suitably actuated carriage N engaging and movable endwise of said track, a frame or bridge E $e$ turnably supported from said carriage and provided with a track, a suitably actuated trolley or carriage C engaging and movable endwise of said last-mentioned track, and a suitably actuated shovel or scoop having an arm pivotally supported from said last-mentioned carriage or trolley and capable of being swung in an upright plane, a horizontally-arranged and suitably actuated countershaft suitably supported from and arranged longitudinally of one side of the aforesaid bridge or frame, and mechanism or apparatus for communicating motion from said countershaft to the shovel-arm, shovel-arm engaging carriage or trolley, frame or bridge bearing said carriage or trolley, and carriage bearing said bridge or frame, substantially as shown, for the purpose specified.

23. In a machine of the variety indicated, in combination, an elevated track $n$; suitably actuated carriage N engaging and movable endwise of said track; a frame or bridge E $e$ turnably supported from said carriage and provided with a track; a suitably actuated trolley or carriage C engaging and movable endwise of said last-mentioned track, and a suitably actuated shovel or scoop having an arm pivotally supported from said last-mentioned carriage or trolley and capable of being swung in an upright plane; a horizontally-arranged countershaft suitably supported from and arranged longitudinally of one side of the aforesaid bridge or frame, and mechanism or apparatus for communicating motion from said countershaft to the shovel-arm, to the shovel-arm engaging carriage or trolley, to the frame or bridge bearing said carriage or trolley, and to the carriage bearing said bridge or frame; engine or motor suitably supported from the central portion of the aforesaid horizontally swinging bridge or frame and having its shaft arranged transversely of said frame or bridge, and shaft $M^4$ intergeared with the engine or motor-shaft and with the aforesaid countershaft, substantially as shown, for the purpose specified.

In testimony whereof I sign this specification, in the presence of two witnesses, this 4th day of June, 1895.

RICHARD THEW.

Witnesses:
C. H. DORER,
ELLA E. TILDEN.